Sept. 6, 1938.   S. W. FERRIS ET AL   2,128,931
REVIVIFICATION OF CLAY AND THE LIKE
Filed April 14, 1936
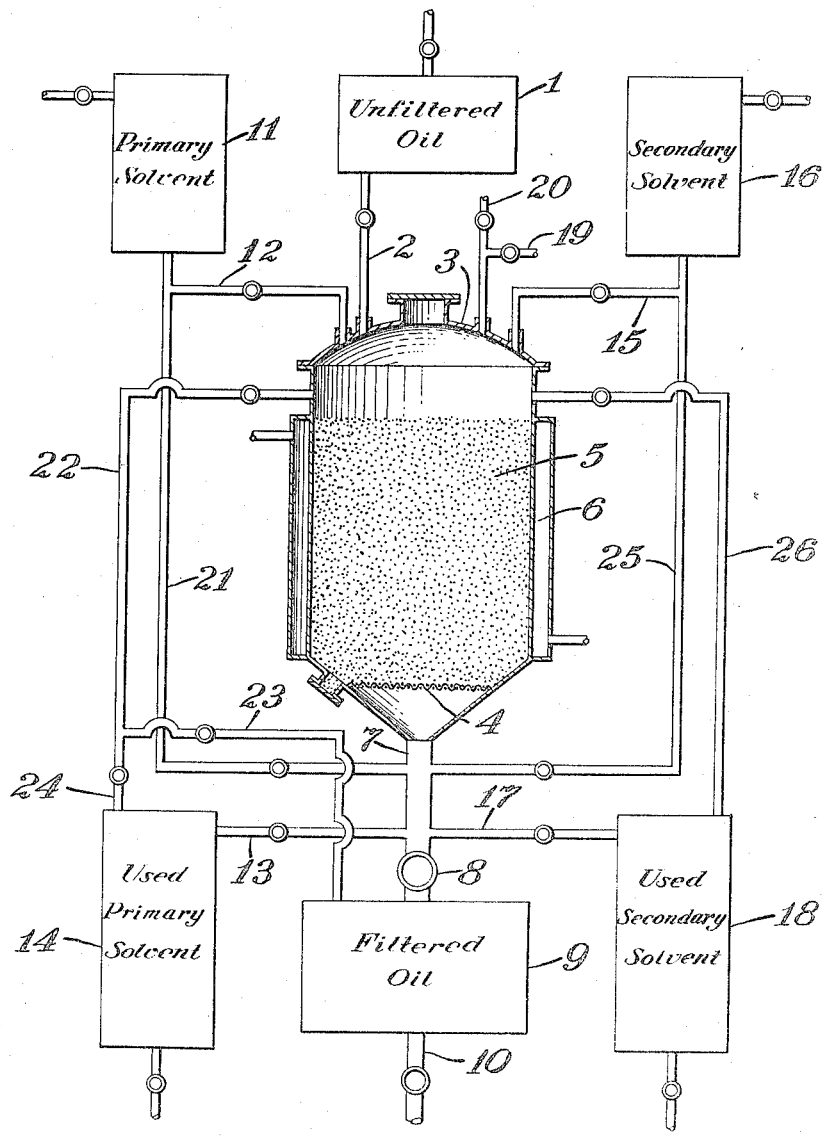
Inventors
Seymour W. Ferris
Henry C. Cowles, Jr.
By T. Wallace Quinn
their Attorney Patented Sept. 6, 1938

UNITED STATES PATENT OFFICE 2,128,931

REVIVIFICATION OF CLAY AND THE LIKE

Seymour W. Ferris, Aldan, and Henry C. Cowles, Jr., Philadelphia, Pa., assignors to The Atlantic Refining Company, Philadelphia, Pa., a corporation of Pennsylvania Application April 14, 1936, Serial No. 74,240

8 Claims. (Cl. 252—2)

The present invention relates to the treatment of decolorizing adsorbents, and relates particularly to the revivification of adsorbents such as decolorizing clay or fuller's earth which have been employed in the treatment of hydrocarbon oils.

A principal object of this invention is the removal of adsorbed coloring matter, polymers and oil from the clay or earth and the rejuvenation of the adsorbent and decolorizing qualities thereof, such rejuvenation or revivification being effected by means of solvent treatment.

A further object of this invention is the revivification of decolorizing adsorbents by means of solvents substantially immiscible with one another, whereby the solvents, and oil which may be contained in the adsorbent, are not contaminated with one another, and the recovery of the solvents by distillation is reduced to a minimum.

A further object of this invention is the revivification of decolorizing adsorbents, employed in the treatment of hydrocarbon oils, with a minimum quantity of solvent, and preferably without removal of the adsorbent from the filtering means.

It has been generally recognized that the coloring element in hydrocarbon oil consists of asphaltic material which is finely dispersed therein, and when filtering such oils to improve the color, the asphalt-like material is selectively adsorbed on the surface and in the pores of the filter medium. The action of the decolorizing earths and clays is not, however, limited to merely adsorbing coloring materials but, in many cases, extends to a polymerization of unstable, unsaturated compounds present in the oils and the subsequent adsorption of the polymers formed in this way.

In the case of decolorizing earths of the type of fuller's earth which have been used in the treatment of petroleum oils and which have become spent, the adsorbed polymers, asphaltic coloring matters and oil are removed by subjecting the earth to a treatment in which it is burned in a rotary kiln. This burning treatment may be preceded by a naphtha washing and steaming. In the course of the burning operation, the adsorbed materials present in the pores and on the surface of the earth are partially removed by the combined distilling and oxidizing effects of the burning.

It has been found that a considerable proportion of the adsorbed material present in the pores of the decolorizing earth become carbonized and, as a result, the decolorizing and adsorptive efficiency of the clay is considerably less than its original efficiency. It is thus apparent that after several recoveries the clay will have deteriorated to such an extent as to be of no further use in decolorizing or treating oil.

Although the method of heating or burning, which has just been described, is used in the revivification of fuller's earth, it is entirely unsatisfactory for rejuvenating certain types of clay which now find wide use in the treatment of hydrocarbon oils. These clays are sometimes spoken of as activated clays or acid treated clays, since it is found that in their natural condition they have little or no decolorizing or adsorptive power but, when treated with acid, develop an active structure and, in many cases, are many times more active than the ordinary fuller's earth. In the case of these acid treated clays, revivification can not be effected by means of burning or heating since the active structure is extremely susceptible to destruction under high temperature conditions and, in most cases where the spent acid treated clays are subjected to a heat treatment, the clays instead of being revived, are rendered useless.

The revivification of decolorizing earths both of the class of fuller's earth as well as of the activated clays may be accomplished with much greater efficiency by dissolving out the adsorbed polymers, coloring matters and oils by means of a solvent which has no harmful effect upon the structure of the clay itself.

We have found that adsorbents such as fuller's earth or clay may be revivified most economically by treating the adsorbent containing the impurities first with a solvent which is capable of replacing the adsorbed impurities and then with a second solvent which is capable of dissolving said impurities, the primary or replacing solvent being of such character as to be substantially immiscible with the secondary solvent and with oil which may be contained in the adsorbent. The primary or replacing solvents include media such as methyl, ethyl, propyl and butyl alcohols containing sufficient water or other agent to render the alcohols substantially immiscible with the second solvent and with hydrocarbon oil. Ketones such as acetone, methyl ethyl ketone and the like containing water or other agent for producing immiscibility may also be employed as the primary or replacing solvent. The secondary solvent or media for dissolving the impurities may include the light hydrocarbon mixtures such as petroleum naphtha or gasoline, carbon disulfide, benzene, carbon tetrachloride, ethylene dichloride, ethyl ether, dichloro ethyl ether and the like.

In the revivification of adsorbents such as fuller's earth or clay employed in the percolation filtration of hydrocarbon oil, it is desirable, from an economic standpoint, to effect the solvent revivification of the adsorbent in the same vessel in which the oil filtration or treatment was carried on. In other words, the revivification is preferably effected "in situ", thus eliminating the expense and labor of removing spent adsorbent from the filtration vessel and the re-charging of the filter with revivified adsorbent. When the solvent treatment is effected "in situ", the direction of flow of the immscible primary and secondary solvents is governed, in general, by the specific gravities of the solvents. For example, when it is desirable to employ ethyl alcohol containing water as the primary solvent and carbon disulfide as the secondary solvent, the primary solvent may be introduced either at the top or bottom of the filter, while the secondary solvent, being the heavier, is preferably introduced at the bottom of the filter. In the event that the primary and secondary solvents are of about the same specific gravity, and both are of greater specific gravity than the oil which may be contained in the spent adsorbent, both solvents are preferably introduced at the bottom of the filter. Or, when the specific gravities of the primary and secondary solvents are of the same order, and both are of less specific gravity than the oil which may be contained in the spent adsorbent, both solvents are preferably introduced at the top of the filter. Thus, the point of introduction and the direction of flow of the immiscible solvents is chosen so as to preserve gravitational stability or equilibrium and to prevent substantial admixing or contamination of the oil which may be contained in the spent adsorbent with the solvents and/or dissolved impurities.

For purposes of illustration, reference is had to the accompanying drawing which is a diagrammatic view of one form of apparatus which may be employed in carrying out our process.

Hydrocarbon oil, for example, lubricating oil which may be diluted with a solvent such as naphtha, is passed, at normal or elevated temperatures, from tank 1 by means of valve-controlled pipe 2 into the filter 3. The filter 3 is provided with a screen 4 supporting the bed of adsorbent 5, and is further provided with a jacket 6 thru which a heating or cooling fluid may be circulated. The oil, decolorized by percolation through the adsorbent 5, is continuously withdrawn from the bottom of the filter through pipe 7 and valve 8 and is collected in the receiving tank 9 which may be continuously or periodically emptied by means of valve-controlled pipe 10. At such time as the maximum yield of filtered oil of a desired color is obtained and the adsorbent 5 has become ineffective as a decolorizing medium, the supply of unfiltered oil from tank 1 is discontinued, and the oil retained in the adsorbent may or may not be drained therefrom, prior to the step of revivification of the adsorbent. In the event that the residual oil is not drained from the bed of adsorbent, a quantity of primary solvent is passed into the top of the filter from supply tank 11 by means of valve-controlled pipe 12. Such primary solvent, for example, ethyl alcohol containing water, is substantially immiscible with oil and is capable of replacing the impurities contained in the adsorbent. The primary solvent, at either normal or elevated temperature, passes downwardly through the bed of adsorbent, displacing the oil and forcing the same into the receiving tank 9 which preferably has been previously emptied of filtered oil. The primary solvent, being of lower specific gravity than the oil retained in the adsorbent and being immiscible with the same, remains as a separate and distinct layer, uncontaminated with the oil being displaced from the adsorbent, and, at the same time such solvent is selectively adsorbed by the adsorbent, thus replacing the impurities contained in the adsorbent bed. At the interface between the oil and the primary solvent there generally will be found a considerable portion of the impurities replaced from the adsorbent by the primary solvent, since such solvent usually has little solvent power for said impurities. When all of the oil has been displaced from the filter bed into the receiving tank 9, the valve 8 and valve-controlled pipe 12 are closed, and the valve-controlled pipe 13 terminating in tank 14 is opened. Preferably simultaneously the valve-controlled pipe 15 is opened and secondary solvent, for example, naphtha from supply tank 16 is introduced into the top of filter 3, above the level of any primary solvent contained therein. The secondary solvent, being substantially immiscible with the primary solvent and capable of dissolving the impurities replaced from but still mechanically held in the adsorbent, performs the dual function of displacing the primary solvent and dissolving the impurities replaced from the adsorbent by the primary solvent. The primary solvent, displaced downwardly by the incoming secondary solvent, is passed from the bottom of the filter 3 through pipe 7 and valve-controlled pipe 13 into tank 14. The primary solvent received in tank 14 may contain a portion of the replaced impurities which have been entrained and carried down mechanically by such solvent. However, such impurities are substantially insoluble in the primary solvent and may be readily separated therefrom by decantation, and the solvent returned to supply tank 11 without distillation or further treatment. When all of the primary solvent has been displaced from the bed of adsorbent, the valve-controlled pipe 13 is closed and valve-controlled pipe 17, terminating in tank 18, is opened. The secondary solvent, containing dissolved impurities which have been replaced or forced from the adsorbent by the primary solvent, is drained from the adsorbent bed and passed through pipe 7 and valve-controlled pipe 17 into tank 18. The filter bed may be flushed with sufficient secondary solvent to insure the removal of impurities released from the adsorbent by the primary solvent, and drained. Any residual primary or secondary solvent retained by the adsorbent may be driven therefrom by the application of air or heated gases through valve-controlled pipe 19, or by steam supplied by means of valve-controlled pipe 20. The revivified bed of adsorbent may then be employed for treating additional quantities of hydrocarbon oil, the filtration and revivification cycles being repeated until the efficiency of the adsorbent is so impaired as to render further use thereof uneconomical.

The revivification of the spent adsorbent may also be effected by the use of primary and secondary solvents which have specific gravities greater than that of the oil which may remain in the filter bed at the completion of the filtration operation. In this instance the primary solvent, for example, methyl alcohol containing water, is passed from supply tank 11 through valve-controlled pipe 21 and pipe 7 into the bottom of the filter 3, displacing the oil and replacing the impurities contained in the adsorbent bed 5. The upwardly displaced oil is drawn from the top of filter 3 through valve-controlled pipes 22 and 23 and passed into the previously emptied receiving tank 9. Upon completion of the displacement of the oil, the valve-controlled pipes 21 and 23 are closed, and valve-controlled pipe 24, terminating in tank 14, is opened. Preferably simultaneously, the valve-controlled pipe 25 is opened and secondary solvent, for example, carbon disulfide from supply tank 16 is introduced into the bottom of the filter through pipe 7. The incoming secondary solvent thus displaces the primary solvent upwardly through the filter bed and out the top of the filter 3 through valve-controlled pipes 22 and 24 into the tank 14, and at the same time the secondary solvent dissolves the impurities which have been replaced from the adsorbent by the primary solvent. When substantially all of the primary solvent has been displaced from the filter bed, the valve-controlled pipes 22 and 24 are closed, and valve-controlled pipe 26, terminating in tank 18, is opened. The flow of secondary solvent is continued and the secondary solvent containing dissolved impurities is drawn from the top of the filter through valve-controlled pipe 26 into tank 18. After the adsorbent bed is flushed sufficiently to remove the secondary solvent containing impurities, the supply of secondary solvent from tank 16 is discontinued by closing valve-controlled pipe 25, valve-controlled pipe 26 is closed and valve-controlled pipe 17 is opened. The secondary solvent remaining in the filter 3 is drained from the adsorbent bed 5 and passed by means of pipe 7 and valve-controlled pipe 17 into tank 18. Any residual primary or secondary solvent retained by the adsorbent may be driven therefrom by the application of air or heated gases through valve-controlled pipe 19, or by steam supplied by means of valve-controlled pipe 20. The revivified bed of adsorbent may then be employed for treating additional quantities of hydrocarbon oil.

In either of the above described methods of operation, the secondary solvent containing dissolved impurities may be withdrawn from tank 18 and passed to distilling apparatus (not shown) wherein the secondary solvent may be separated from the impurities by vaporization, the solvent vapors condensed, and the condensate returned to supply tank 16 for re-use. Furthermore, instead of removing any residual primary or secondary solvent from the revivified adsorbent by means of steam, air or heated gases, such removal may be accomplished by merely heating the oil to be treated to a temperature sufficient to vaporize said solvents and passing the heated oil through the adsorbent bed. In this manner the heated oil simultaneously frees the adsorbent of solvent and is itself decolorized.

It may be desirable, in some instances, to effect the removal of the bulk of the oil retained in the spent adsorbent by means of steam or washing with a secondary solvent such as naphtha, prior to subjecting the spent adsorbent to the revivification treatment. Furthermore, in the revivification operation, the treatment with the primary solvent and with the secondary solvent at normal temperatures may be followed by a treatment with a secondary solvent at elevated temperature, prior to the freeing of the revivified adsorbent of solvents by heated gases or oil.

In accordance with our invention, various modifications of the revivification operation which may be employed are briefly outlined as follows. The spent adsorbent containing hydrocarbon oil may be treated with:

I (a) Primary solvent, (b) secondary solvent, (c) heated gas.
II (a) Primary solvent, (b) secondary solvent, (c) heated oil.
III (a) Primary solvent, (b) secondary solvent, cold, (c) secondary solvent, hot, (d) heated oil.
IV (a) Primary solvent, (b) secondary solvent, (c) heated gas, (d) heated oil.
V (a) Primary solvent, (b) secondary solvent, hot, (c) heated gas.
VI (a) Primary solvent, (b) secondary solvent, hot, (c) heated oil.
VII (a) Steam or secondary solvent, (b) primary solvent, (c) secondary solvent, (d) heated gas.
VIII (a) Steam or secondary solvent, (b) primary solvent, (c) secondary solvent, (d) heated oil.

Our process of revivification may be further illustrated by the following specific examples, wherein substantially immiscible primary and secondary solvents are employed in the treatment of a spent decolorizing clay. In each instance, a solution of 30% by volume of a Pennsylvania grade cylinder oil stock in 70% by volume of petroleum naphtha was filtered through a bed of adsorbent clay, at a temperature of 70° F., to produce a filtered oil of a given color. The clay initially used for the filtration was arbitrarily designated as being 100% efficient, and the comparative efficiencies of the revivified clay is shown in each example.

(1) The spent filter bed containing residual oil was first treated with a primary solvent consisting of 90% acetone and 10% water, by passing the solvent downwardly through the spent adsorbent. The primary solvent was then displaced from the adsorbent by passing a secondary solvent consisting of naphtha downwardly through the adsorbent bed. The secondary solvent was then drained from the adsorbent bed and traces of solvent were removed therefrom by heating the bed to about 250° F. under reduced pressure. Naphtha diluted oil was then filtered through the adsorbent and the decolorizing efficiency was found to be 92% of the initial efficiency.

(2) The process of Example 1 was repeated employing as the primary solvent 85% ethyl alcohol and 15% water (passing downwardly), and as the secondary solvent, carbon disulfide (passing upwardly). The efficiency of the revivified adsorbent was found to be 79%.

(3) The process of Example 1 was repeated employing as the primary solvent 80% methyl alcohol and 20% water (passing upwardly), and as the secondary solvent, benzol (passing upwardly). The efficiency of the revivified adsorbent was found to be 75%.

It will be seen, from the foregoing description, that our process consists essentially in treating a spent adsorbent, which may or may not contain oil, with a primary solvent which is substantially immiscible with oil and with the impurities, but which is capable of replacing the impurities, i. e., asphaltic, resinous or polymerized bodies, contained in the spent adsorbent. As the second step in our process, the adsorbent is treated with a secondary solvent which is substantially immiscible with the primary solvent but which is capable of dissolving the replaced impurities.

The employment of a primary solvent of the aforesaid character eliminates to a substantial extent the contamination of the oil therewith, and, since such solvent replaces the impurities in the adsorbent without dissolving same to any substantial extent, the solvent may be continuously re-used without the distillation or other treatment. The employment of a secondary solvent which is substantially immiscible with the primary solvent but which will dissolve replaced impurities, eliminates the mixing or contamination of the primary with the secondary solvent, and, since only the secondary solvent dissolves the impurities, the recovery of solvent by distillation is therefore limited to the secondary solvent. Furthermore, in accordance with our invention, it is not necessary to employ excessive quantities of solvents, since only sufficient primary solvent is required to wet the adsorbent and replace the impurities. And, the quantity of secondary solvent required depends primarily upon its solvent power for the impurities, i. e., the greater the solvent power, the less the solvent required. Moreover, since the secondary solvent is substantially immiscible with the primary solvent and admixing is thus eliminated, the quantity of secondary solvent required to effect the desired degree of removal of impurities is somewhat less than in the case of completely miscible solvent mixtures.

While our process has been described primarily with reference to the use of single primary solvents and single secondary solvents, we contemplate as within the scope of our invention the use of mixtures of primary solvents followed by mixtures of secondary solvents.

Furthermore, our process of revivification may be applied to a variety of adsorbent or decolorizing media, including adsorbent earths or clays, activated carbon, activated silica and alumina, and various other natural or prepared adsorptive substances.

What we claim is:

1. In a process of revivifying spent adsorbents employed in decolorizing hydrocarbon oils, the steps which comprise leaching said adsorbent with an organic solvent capable of replacing the impurities of said adsorbent, and then leaching said adsorbent with an organic solvent capable of dissolving said impurities, said first mentioned solvent being substantially immiscible with said second solvent and with hydrocarbon oil.

2. In a process of revivifying spent adsorbents employed in decolorizing hydrocarbon oils, the steps which comprise leaching said adsorbent with an organic solvent capable of replacing the impurities of said adsorbent, and then leaching said adsorbent with a light hydrocarbon solvent capable of dissolving said impurities, said first mentioned solvent being substantially immiscible with said second solvent and with hydrocarbon oil.

3. In a process of revivifying spent adsorbents employed in decolorizing hydrocarbon oils, the steps which comprise leaching said adsorbent with an alcohol capable of replacing the impurities of said adsorbent and then leaching said adsorbent with an organic solvent capable of dissolving said impurities, said alcohol containing sufficient water to render same substantially immiscible with said second solvent and with hydrocarbon oil.

4. In a process of revivifying spent adsorbents employed in decolorizing hydrocarbon oils, the steps which comprise leaching said adsorbent with an alcohol capable of replacing the impurities of said adsorbent and with a light hydrocarbon solvent capable of dissolving said impurities, said alcohol containing sufficient water to render same substantially immiscible with said second solvent and with hydrocarbon oil.

5. In a process of revivifying spent adsorbents employed in decolorizing hydrocarbon oils, the steps which comprise leaching said adsorbent with an alcohol capable of replacing the impurities of said adsorbent and with naphtha capable of dissolving said impurities, said alcohol containing sufficient water to render same substantially immiscible with said naphtha and with hydrocarbon oil.

6. In a process of revivifying spent adsorbents employed in decolorizing hydrocarbon oil, the steps which comprise displacing oil from a body of adsorbent containing impurities with an organic solvent substantially immiscible with said oil and capable of replacing said impurities, and displacing said first mentioned solvent and impurities with a second organic solvent capable of dissolving said impurities and being substantially immiscible with said first mentioned solvent.

7. In a process of revivifying spent decolorizing clay employed in the treatment of hydrocarbon oils, the steps which comprise leaching said clay with an organic solvent capable of replacing the impurities contained in said clay, and then leaching said clay with an organic solvent capable of dissolving said impurities, said first mentioned solvent being substantially immiscible with said second mentioned solvent and with hydrocarbon oil.

8. In a process of revivifying spent decolorizing clay employed in the treatment of hydrocarbon oils, the steps which comprise displacing oil from a body of decolorizing clay containing impurities with an organic solvent substantially immiscible with said oil and capable of replacing said impurities, and displacing said first mentioned solvent and impurities with a second organic solvent capable of dissolving said impurities and being substantially immiscible with said first mentioned solvent.

SEYMOUR W. FERRIS.
HENRY C. COWLES, Jr.